May 10, 1960 W. T. PICKAVANCE ET AL 2,935,964
TEAT CUP INFLATION
Filed April 23, 1957
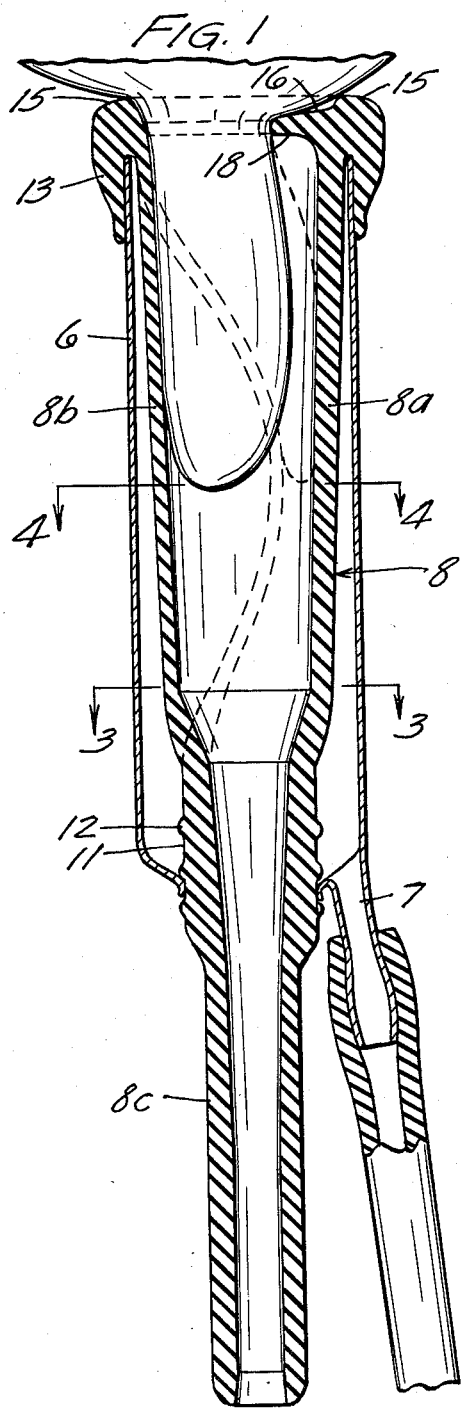
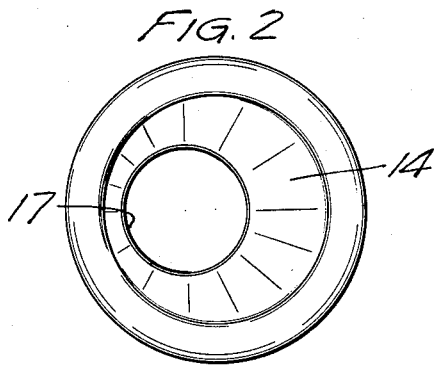
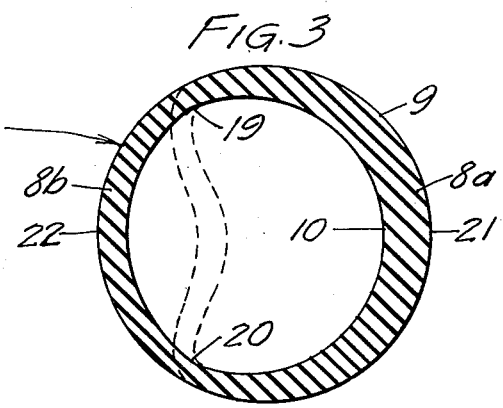
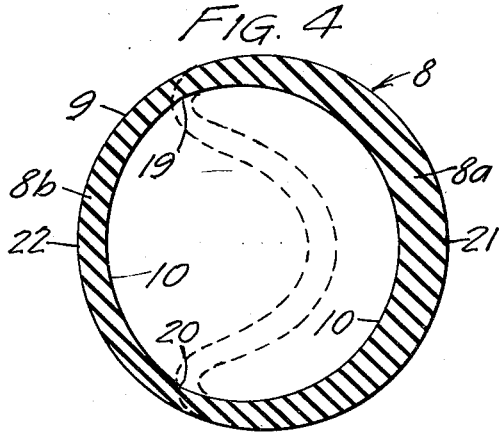
INVENTORS
WILLIAM T. PICKAVANCE
CLIFFORD R. BROWN
ALBERT G. ROSE
BY Williamson, Schroeder, Adams & Meyers
ATTORNEYS

2,935,964
TEAT CUP INFLATION

William T. Pickavance, Clifford R. Brown, and Albert G. Rose, Albert Lea, Minn., assignors to National Cooperatives, Incorporated, Albert Lea, Minn., a corporation of the District of Columbia Application April 23, 1957, Serial No. 654,523

5 Claims. (Cl. 119—14.52)

This invention relates to pulsating teat cups for milking apparatus. More particularly it relates to a flexible liner for the teat cup shells, more often referred to in the art as teat cup inflations.

One of the most widely accepted teat cup inflations currently in use has a design such as to promote the entrance of a slight amount of air into the interior of the inflation during the squeeze interval which takes place when the pressure within the interior of the inflation is reduced. This type of teat cup inflation can best be referred to by examination of United States Letters Patent No. 2,340,296, issued February 1, 1944, to Lloyd F. Bender, Waukesha, Wisconsin. The teat cup inflation as disclosed therein features a cross-sectional configuration which is oval and an eccentrically positioned teat receiving opening at its terminal. Although such a teat inflation functions with marked improvement over teat cup inflations as known prior to its development, its particular cross-sectional configuration makes it relatively expensive to prepare the molds necessary for their manufacture. Even more important, however, has been the fact that as designed, such a teat inflation collapses in such a manner that the rubber from which the side wall of the inflation is manufactured, spreads outwardly along the lines of collapse and wears against the interior surface of the metal teat cup shell, with the results that the teat cup inflation is gradually weakened along the line of collapse so that it loses its ability to return to its original shape after having been collapsed. In other words, such teat cup inflations will collapse permanently earlier than should be necessary, were it not for the need for the metal teat cup which surrounds them. My invention is designed to overcome both of these disadvantages and yet retain all of the advantages of such a teat cup inflation.

It is a general object of our invention to provide a novel and improved teat cup inflation of simple and inexpensive construction and improved funtion.

A more specific object is to provide a novel and improved teat cup inflation designed to lengthen the useful life span thereof while reducing the cost of manufacture and retaining the most desirable features heretofore known.

A still more specific object is to provide a novel and improved teat cup inflation constructed to enable it to be manufactured more inexpensively and to increase its useful life span as a result of re-designing the cross-sectional configuration of the inflation.

Another object is to provide a novel and improved teat cup inflation designed to so position the lines of collapse as to avoid wear of the side wall of the inflation against the metal teat cup along those lines.

Another object is to provide a novel and improved teat cup inflation designed in cross-sectional configuration so that the side wall of the inflation will tend to swing inwardly rather than outwardly along the lines of collapse, and thus preclude undue wear of the teat inflation side wall at such lines of collapse against the teat cup shell.

Another object is to provide a novel and improved teat cup inflation designed so that the molds necessary for its manufacture can be quickly, easily and inexpensively constructed on a lathe with relatively unskilled labor.

These and other objects and advantages of our invention will more fully appear from the following description, made in connection with the accompanying drawings, wherein like reference characters refer to the same or similar parts throughout the several views, and in which:

Fig. 1 is a vertical sectional view of a teat cup inflation embodying our invention and mounted within a teat cup shell and applied to the teat of a cow;

Fig. 2 is a top plan view of my teat cup inflation;

Fig. 3 is a sectional view on an enlarged scale taken along line 3—3 of Fig. 1; and Fig. 4 is a sectional view on an enlarged scale taken along line 4—4 of Fig. 1.

One embodiment of our invention includes as shown in Figs. 1–4, a teat cup inflation indicated generally by the numeral 8 which is adapted to be mounted within a conventional teat cup shell 6 of generally cylindrical form. This teat cup shell 6 as shown, is open at its top and somewhat contracted at its lower end and provided with a lateral spud or nipple 7 which communicates with the interior of the shell. The particular shape and proportion of the teat cup shell is not material to the present invention. As shown, the teat cup inflation 8 is of a flexible, resilient tubular construction, preferably of rubber or some other pliable material and tapering downwardly as best shown in Fig. 1. The tubular body or member which comprises the inflation 8 is preferably made of rubber of the same flexibility and resiliency throughout. These inflations are preferably moulded, and as shown, have a circular outer surface 9 and an interior surface 10 which approaches a circular configuration but is not exactly circular as can best be seen by reference to Figs. 3 and 4.

At its lower end the inflation 8 continues as an integral milk tube 8c which at its juncture with the body of the inflation is enlarged to fit the opening in the contracted end of the shell and is provided with peripheral corrugation 12 for sealing engagement with the end of the shell. It will be readily understood, of course, that these parts may be separately formed and connected in any suitable manner in accordance with what is well known in the art.

At its top the inflation extends beyond the terminus of the shell and is provided with a surrounding depending skirt 13 which overlaps the upper portion of the shell and hermetically seals the joints between the inflation and the shell. The top 14 of the inflation is adapted to make a hermetically sealed contact with the udder during the greater portion of the operating cycle just as is the case in the construction of the inflation shown in United States Letters Patent No. 2,340,296, previously referred to herein. The terminal face of the inflation is provided with a concentric bead or rib 15 in close relation with the periphery of the top of the inflation within which is a depressed seating area 16 for the udder. Within the depressed seat 16 of the inflation teat is a teat receiving opening 17 of less diameter than the interior of the inflation and which is laterally offset in eccentric relation with the axis of the inflation. The opening 17 is tangential to one side of the inner surface of the inflation as can best be seen in Figs. 1 and 2. At the opposite side of the inflation there is an inwardly projecting or overhanging flange or lip 18 of quite appreciable extent which performs the same functions as the corresponding flange or lip set forth in the United States Letters Patent referred to hereinbefore.

Although the interior surface of the side wall of the inflation 8 approaches a circular configuration it varies slightly therefrom as a result of the mold in which it is formed being constructed so that the mandrel is formed with two different centers. In forming the molds for this inflation, the first step is to drill a cylindrical hole in a metal block which forms the mold for the exterior surface of the inflation. As previously pointed out, this surface is circular and hence the construction is simplified, for the formation of a cylindrical hole is a relatively easy and inexpensive matter.

By referring to Figs. 3 and 4, it can be seen that the interior opening of the inflation 8 is positioned eccentrically to provide a thicker side wall portion 8a and a thinner side wall portion 8b which are positioned opposite each other. These side wall portions 8a and 8b are differentially resistant to collapsing influence because of the difference in their thickness and the fact that the inflation is made of a rubber material having the same resiliency and flexibility throughout. Thus when the interior of the inflation 8 has the pressure reduced as compared to the pressure on the other surface of the inflation, the wall portion 8b will provide less resistance to the tendency to collapse than will the wall portion 8a. The fact that the mandrel which is used in the molding of the inflation is formed on two centers, makes the side wall weakest or thinnest at the two points indicated by the numerals 19 and 20. It is understood, of course, that this will not necessarily be a point but will constitute a relatively thin side wall portion which will hereinafter be referred to as the hinge portions 19 and 20. The mandrel referred to is constructed by forming approximately one third of the outer surface thereof on one center and approximately the other two thirds of the outer surface thereof on another center displaced from the first-mentioned center. The radii of the two portions of the outer surface are slightly different from one another, the radius of the surface on the mandrel which forms the thinner wall portion 8b of the inflation being slightly greater than the radius of the surface on the mandrel defining the thicker wall portion 8a. This construction provides the relatively thin portions 19 and 20 which function as a hinge and are thinner than the two side wall portions 8a and 8b. As can best be seen in Fig. 3, these hinge portions 19 and 20 are approximately 120 degrees apart and connect the side wall portions 8a and 8b. These hinge portions are least resistant to the collapsing influence provided by a reduction of pressure within the inflation but because they are so short, circumferentially speaking, they merely function as they hinge for the relatively thin portion 8b when it collapses into a crescent-like shape as shown by the broken lines in Figs. 3 and 4. It will be noted that the side-wall portion 8a is thickest at the point 21 and decreases in thickness in both directions toward the hinge portions 19 and 20. Similarly the side wall portion 8b is thickest at the point 22 and decreases in thickness progressively toward the two hinge portions 19 and 20. Thus the thickest portions of the side wall portions 8a and 8b are directly opposite each other at the points 21 and 22.

From the above it can be seen that the side wall portion 8a which has the greater resistance to a collapsing influence extends from the hinge portion 19 circumferentially through the point 21 and over to the hinge portion 20 while the side wall portion 8b which has a lesser resistance to the collapsing influence as compared to the side wall portion 8a, extends from the hinge portion 19 to the hinge portion 20 in the opposite direction. It will be noted that the line of collapse of the inflation 8 extends longitudinally of this tubular body or member through the hinge portions 19 and 20 and that these lines are therefore approximately 120 degrees apart, circumferentially speaking. In other words, these lines define an arc of approximately 120 degrees.

When the pressure is reduced within the inflation 8, the side wall portion 8b will collapse into a crescent-like shape as shown in Figs. 3 and 4. It will be noted that the hinge portions 19 and 20 permit this collapse and in fact, foster it for the side wall structure is weakest at these two areas and hence the relatively weak side wall portion 8b will move inwardly to assume the crescent-like shape as illustrated in Figs. 3 and 4. As the result of this inward flexing of the side wall portion 8b, the material of the side walls at the hinge portions 19 and 20 moves inwardly away from the metal teat cup 6 rather than outwardly into engaging relation therewith as has heretofore been the case with inflations currently in use. In other words, the rubber material of the inflation pulls away from the teat cup shell at the line of collapse so that there is no engagement with the teat cup shell and consequently no possible wear at these areas. Since the wear is eliminated by this manner of collapse, the teat cup inflation will last much longer and permanent collapse of the teat cup will not set in at as early a date as in the use of the conventional teat cup when the side wall of the inflation wears against the teat cup shell. From this it can be readily seen that the teat cup inflation when manufactured with a cross-sectional configuration as disclosed herein, has a longer useful life span than if manufactured with a cross-sectional configuration as heretofore known.

In addition to the fact that the teat cup inflation when manufactured with a cross-sectional configuration as shown herein will last much longer, there is an added advantage attained in that the molds required for the manufacture of these inflations are much easier to make and hence are substantially less expensive. The molds for a teat cup inflation manufactured in accordance with the disclosure herein can be formed on a common lathe and as a result the ultimate cost of manufacture of the inflation is substantially reduced.

It will be noted by reference to Fig. 1 that the teat receiving opening 17 is positioned substantially tangential to the inner surface of the side wall of the inflation 8 and that therefore the teat of the cow extends downwardly in close proximity or in registering relation with the thin side wall 8b of the inflation. It will also be noted that the teat of the cow will be in spaced relation to the relatively thick side wall portion 8a except when the inflation moves to collapsed position at which time the teat of the cow is forced over beneath the lip 18 to aid in retaining the inflation upon the teat of the cow. Thus it will be seen that the advantages as set forth in U.S. Letters Patent No. 2,340,296 are retained in full while the useful life span of the inflation is increased and the cost of manufacture thereof is substantially reduced.

It will, of course, be understood that various changes may be made in the form, details, arrangement and proportions of the parts without departing from the scope of our invention which consists of the matter shown and described herein and set forth in the appended claims.

What is claimed is:

1. A teat cup inflation for a milking apparatus comprising a flexible resilient tubular body having side wall structure periodically collapsible under fluctuations of relative internal and external pressures, one portion of the side wall structure of said tubular body being of greater thickness than the opposite portion of said side wall structure to provide a greater resistance to collapsing, said opposed portions being joined by hinge portions, said hinge portions having a circumferential dimension substantially less than that of either of said side wall portions, said hinge portions being thinner than either of said side wall portions such as to be more readily flexible than either of said opposed portions, said one side wall portion extending circumferentially of said tubular body more than 180 degrees whereby said opposite portion of the tubular body will collapse inwardly at said hinge portions when the internal pressure within said tubular member is reduced to a level below the external pressure on the tubular member.

2. A teat cup inflation as defined in claim 1, wherein said hinge portions of said tubular body are circumferentially spaced approximately 120 degrees from one another.

3. A teat cup inflation for a milking apparatus comprising a flexible resilient tubular body having side wall structure periodically collapsible under fluctuations of relative internal and external pressures, one portion of the side wall structure of said tubular body being of greater thickness than the opposite portion of said side wall structure to provide a greater resistance to collapsing, said opposed portions being joined by hinge portions, said hinge portions having a circumferential dimension substantially less than that of either of said side wall portions, said hinge portions being thinner than either of said side wall portions such as to be more readily flexible than either of said opposed portions, said one side wall portion extending circumferentially of said tubular body more than 180 degrees, each of said opposed portions of the body having points of maximum thickness, said points of maximum thickness being disposed substantially opposite to one another whereby said opposite portion of the tubular body will collapse inwardly at said hinge portions when the internal pressure within said tubular member is reduced to a level below the external pressure on the tubular member.

4. A teat cup inflation as defined in claim 3, wherein each of said opposed side portions decreases gradually in thickness from its point of maximum thickness toward said hinge portions.

5. A teat cup inflation for a milking apparatus comprising a flexible resilient tubular body having side wall structure periodically collapsible under fluctuations of relative internal and external pressures, one portion of the side wall structure of said tubular body being of greater thickness than the opposite portion of said side wall structure to provide a greater resistance to collapsing, said opposed portions being joined by hinge portions, said hinge portions having a circumferential dimension substantially less than that of either of said side wall portions, said hinge portions being thinner than either of said side wall portions such as to be more readily flexible than either of said opposed portions, said one side wall portion extending circumferentially of said tubular body more than 180 degrees whereby said opposite portion of the tubular body will collapse inwardly at said hinge portions when the internal pressure within said tubular member is reduced to a level below the external pressure on the tubular member, said body having formed at one terminal end thereof an eccentrically disposed teat receiving opening therein, said opening being in substantially tangential relationship with the interior surface of said opposite side wall portion of the body and inwardly offset relative to the inner surface of said one side wall portion of the body.

References Cited in the file of this patent
UNITED STATES PATENTS

| | | |
|---|---|---|
| 949,186 | Klein | Feb. 15, 1910 |
| 2,340,296 | Bender | Feb. 1, 1944 |

FOREIGN PATENTS

| | | |
|---|---|---|
| 1,113,916 | France | Apr. 5, 1956 |